United States Patent [19]
Pan et al.

[11] Patent Number: 5,748,478
[45] Date of Patent: May 5, 1998

[54] OUTPUT MANAGEMENT OF PROCESSING IN A MANUFACTURING PLANT

[75] Inventors: Yirn-Sheng Pan; Horng-Huei Tseng, both of Hsin chu, Taiwan

[73] Assignee: Vanguard International Semiconductor Corporation, Hsin-Chu, Taiwan

[21] Appl. No.: 820,468

[22] Filed: Mar. 17, 1997

[51] Int. Cl.⁶ .................. G06F 19/00; G06G 7/64; G06G 7/66
[52] U.S. Cl. .................. 364/468.05; 364/468.03; 364/468.07; 364/468.08; 364/468.12
[58] Field of Search .................. 364/468.05, 468.03, 364/468.06, 468.07, 468.08, 468.01, 401 R, 550, 468.12, 468.16, 468.28, 468.15

[56] References Cited

U.S. PATENT DOCUMENTS

| | | | |
|---|---|---|---|
| 4,852,001 | 7/1989 | Tsushima et al. | 364/401 |
| 5,255,181 | 10/1993 | Chapman et al. | 364/401 |
| 5,495,417 | 2/1996 | Fuduka et al. | 364/468 |
| 5,537,591 | 7/1996 | Oka | 395/600 |
| 5,544,350 | 8/1996 | Hung et al. | 395/500 |
| 5,546,326 | 8/1996 | Tai et al. | 364/552 |
| 5,581,691 | 12/1996 | Hsu et al. | 395/182.13 |
| 5,612,886 | 3/1997 | Weng | 364/468.07 |

*Primary Examiner*—Paul P. Gordon
*Assistant Examiner*—Ramesh Patel
*Attorney, Agent, or Firm*—George O. Saile; Stephen B. Ackerman; Graham S. Jones, III

[57] ABSTRACT

A method of output management of processing in a manufacturing plant with a plurality of stages during a running period. The method begins with the step of determining the stage In Flow of Work In Process (WIP) in the plant, determining the Out Flow of WIP in the plant, and calculating Flow Intensity of the plant, followed by calculating the equipment Capacity of the plant. The next steps are to calculate Equipment Capacity allocation of the plant, determine the bottleneck Stage Capacity of stages in the plant, determine the Rolling Output of the plant, followed by calculation of the Remaining Work In Process of the plant. Data on the Daily Output is collected. Remaining Work In Process is duplicated as Initial WIP for the next day. Testing is made to determine whether the running period has ended, and until the running period has ended, the method repeatedly loops back to the In Flow step.

32 Claims, 5 Drawing Sheets

OUTPUT MANAGEMENT OF PROCESSING IN A MANUFACTURING PLANT

BACKGROUND OF THE INVENTION

1. Field of the Invention

This invention relates to scheduling systems for fabrication and manufacturing plants and more particularly to plants for the fabrication of integrated circuits.

2. Description of Related Art

The accurate forecasting of wafer output from a fabrication plant is very important to setting sales and operation targets, but traditional methods which use average daily output and bottleneck throughput data have the disadvantage of mismanagement of plant operation causing significant loss in efficiency through waste of plant capacity which also causes the problem of excessive product cycle time.

U.S. Pat. No. 4,852,001 for "Job Scheduling Method and System" describes a method for scheduling of job allocation to resources. Each workload of a job is allocated to each time unit along a time axis in units of job and resource type. Based on allocation of the workload in units of resource type, an initial workload for all resources at each time unit is calculated. A first workload balancing is performed for an initial workload at a time unit exceeding a resource capacity so as to balance the initial workload within the resource capacity. Thereafter, a second workload balancing is performed to balance a workload allocated in units of resource type within its resource capacity.

U.S. Pat. No. 5,255,181 of Chapman et al for "Method of Planning Organizational Activities" describes a method for allocating resources to a plurality of lots to accomplish goals. The method includes the following steps. Form a list identifying time-valued commitments to future uses of the resources by a first portion of the lots. Identify one of the lots not included within the first portion of the lots, the one lot having a demand for the resources which is defined by instructions presented in a process flow description associated with that one lot. Obtain the process flow description. Simulate allocation of the resources to the lot in accordance with the demand and the process flow description instructions. The simulated allocations do not interfere with commitments identified in the list. Then the list is modified to reflect commitments to the one lot.

SUMMARY OF THE INVENTION

The advantages of the present invention are as follows:
(1) Considering the real time WIP (Work in Process) profile, the WIP profile will seriously impact to the FAB (Fabrication plant) output, so this dynamic method simulates FAB WIP moving to make an output forecast.
(2) The traditional method sets up the operation target by average Daily Output ($DO_j$,) unreasonably allocating Equipment Capacity ($C_i$) that will cause a loss of equipment capacity.
(3) More than wafer output information can be acquired. Due to the method of this invention of simulating movements of a wafer in a FAB, one can obtain data on stage moves, on stage turn ratio, and even on scrapped wafers.
(4) To allocate Equipment Capacity ($C_i$) according to flow intensity to produce an increase of machine utilization provides little loss in efficiency of FAB equipment.
(5) The wafer start (wafer release) is the basic factor which impacts upon the FAB cycle time. This method provides a wafer start buffer to be input at the start of each day. Through use of this tuning process facilitation of a wafer start strategy that meets the requirements of decision makers is achieved.
(6) Dealing with multiple products is an improvement over considering one base line product in the traditional method.

In accordance with this invention, a method is provided for output management of processing in a manufacturing plant with a plurality of stages during a running period, including the following steps. The beginning of the process is the step of determining the stage In Flow ($IFS_{ij}$) of Work In Process (WIP) in the plant; and the Out Flow ($OF_{ij}$) of Work In Process (WIP) in the plant. Calculate Flow Intensity ($FL_{ij}$) of the plant; the equipment Capacity ($C_{ij}$) of the plant; and the Equipment Capacity allocation ($EC_{ij}$) of the plant. Determine the bottleneck Stage Capacity ($SC_{ij}$) of stages in the plant; and the Rolling Output ($O_{ij}$) of the plant. Calculate Remaining Work In Process ($RW_{ij}$) of the plant. Collect Daily Output ($DO_{ij}$). Duplicate Remaining Work In Process ($RW_{ij}$) as Initial WIP ($W_{ij}$) for next day. Then test to determine whether the running period has ended and repeatedly loop back to the beginning of the process until the running period has ended.

Preferably, the In Flow ($IF_{ij}$) is calculated with the formula, as follows:

$$IF_{ij} = \sum_{m=s}^{i} W_{mj}$$

while Stage "s" meets $$\sum_{m=s}^{i} CT_{mj} = 1, s \leq i$$

where: i=Stage No.=1,2, ... N; j=Part No.=1,2, ... P.
The Out Flow ($OF_{ij}$) is calculated as follows:

$$OF_{ij} = \sum_{m=i}^{t} W_{mj}$$

while Stage "m" meets $$\sum_{m=i}^{t} CT_{mj} = 1, t > i$$

where: i=Stage No.=1,2, ... N; j=Part No.=1,2, ... P.
The stage flow intensity is calculated as follows:

$$FL_{ij} = \frac{IF_{ij}}{OF_{ij}}.$$

The Equipment Capacity ($C_i$) is calculated as follows:

$$C_i = NO_i \times POH_i \times AV_i \times EFF_i$$

where $POH_i$=ith equipment POH
$AV_i$=ith equipment Availability Ratio
$EFF_i$=ith equipment Efficiency Ratio
$NO_i$=ith equipment number
i=Equipment 1,2, ... M The Equipment Capacity Allocation to Recipes $EC_{kij}$ is calculated as follows:

$$EC_{kij} = \frac{FL_{ij}}{\sum_{x \in Y} FL} , \text{where}$$

k=Recipe No. in stage i=1,2,...R;
i=Stage No.=1,2,...N; j=Part No.=1,2,...P;
Y=set of recipes and their equipment are the same
x=Recipe Equipment
∈=Belongs to.

The bottleneck Stage Capacity ($SC_{ij}$) is calculated as follows:

$$SC_{ij} = \text{MIN}\{EC_{kij}\}$$

where
i=Stage No.=1,2,...N;
j=Part No.=1,2,...P;
k=recipe number in stage i.

The Rolling Output ($O_{ij}$) is calculated as follows:

$$O_{ij} = SC_{ij}$$

if $(W_{ij} + \frac{1}{2} O_{(i-1)j}) > SC_{ij}$ $$O_{ij} = W_{ij} + \frac{1}{2} O_{(i-1)j}$$

if $(W_{ij} + \frac{1}{2} O_{(i-1)j}) \leq SC_{ij}$ where
i=Stage No.=1,2,...N; j=Part No.=1,2,...P.

The Remaining WIP ($RW_{ij}$) is calculated as follows:

$$RW_{ij} = W_{ij} \times O_{(i-1)j} - O_{ij}$$

where: i=Stage No.=1,2,...,N; j=Part No.=1,2,...,P.

A system for output management of processing in a manufacturing plant with a plurality of stages during a running period includes the following features. In the initial function of the system, means are provided for determining the stage In Flow ($IF_{ij}$) of Work In Process (WIP) in the plant; for determining the Out Flow ($OF_{ij}$) of Work In Process (WIP) in the plant; for calculating Flow Intensity ($FL_{ij}$) of the plant; and for calculating equipment Capacity ($C_{ij}$) of the plant. In addition, means is provided for calculating Equipment Capacity allocation ($EC_{ij}$) of the plant; for determining the bottleneck Stage Capacity ($SC_{ij}$) of stages in the plant; for determining the Rolling Output ($O_{ij}$) of the plant; and for calculating the Remaining Work In Process ($RW_{ij}$) of the plant. Means is provided for collecting Daily Output ($DO_j$). Means is provided for duplicating Remaining Work In Process ($RW_{ij}$) as Initial WIP ($W_{ij}$) for next day. Means is provided for testing to determine whether the running period has ended and repeatedly loop back to the initial function of the system until the running period has ended.

The In Flow ($IF_{ij}$) is calculated with the formula, as follows:

$$IF_{ij} = \sum_{m=s}^{i} W_{mj}$$

while Stage "s" meets $$\sum_{m=s}^{i} CT_{mj} = 1, s \leq i$$

where
i=Stage No.=1,2,...N; j=Part No.=1,2,...P.

The Out Flow ($OF_{ij}$) is calculated with the formula, as follows:

$$OF_{ij} = \sum_{m=i}^{t} W_{mj}$$

while Stage "m" meets $$\sum_{m=i}^{t} CT_{mj} = 1, t > i$$

where
i=Stage No.=1,2,...N; j=Part No.=1,2,...P.

Then stage flow intensity is calculated as follows:

$$FL_{ij} = \frac{IF_{ij}}{OF_{ij}}$$

The Equipment Capacity ($C_i$) is calculated as follows:

$$C_i = NO_i \times POH_i \times AV_i \times EFF_i$$

where
$POH_i$=ith equipment POH
$AV_i$=ith equipment Availability Ratio
$EFF_i$=*ith equipment Efficiency Ratio*
$NO_i$=ith equipment number
i=Equipment 1,2,...M.

The Equipment Capacity Allocation to Recipes $EC_{kij}$ is calculated as follows:

$$EC_{kij} = \frac{FL_{ij}}{\sum_{x \in Y} FL}$$

where:
k=Recipe No. in stage i=1,2,...R;
i=Stage No.=1,2,...N; j=Part No.=1,2,...P;
Y=set of recipes and their equipment are the same
x=Recipe Equipment
∈=Belongs to.

The bottleneck Stage Capacity ($SC_{ij}$) is calculated as follows:

$$SC_{ij} = \text{MIN}\{EC_{kij}\}$$

where:
i=Stage No.=1,2,...N;
j=Part No.=1,2,...P;
k=recipe number in stage i.

The Rolling Output ($O_{ij}$) is calculated as follows:

$$O_{ij} = SC_{ij}; \text{ if } (W_{ij} + \frac{1}{2} O_{(i-1)j}) > SC_{ij}$$

$$O_{ij} = W_{ij} + \frac{1}{2} O_{(i-1)j}; \text{ if } (W_{ij} + \frac{1}{2} O_{(i-1)j}) \leq SC_{ij}$$

where:

i=Stage No.=1,2,..,N; j=Part No.=1,2,..,P.

The Remaining WIP ($RW_{ij}$) is calculated as follows:

$$RW_{ij}=W_{ij} \times O_{(i-1)j} - O_{ij};$$

where: i=Stage No.=1,2,..,N; and j=Part No.=1,2,..,P.

BRIEF DESCRIPTION OF THE DRAWINGS

The foregoing and other aspects and advantages of this invention are explained and described below with reference to the accompanying drawings, in which.

DESCRIPTION OF THE PREFERRED EMBODIMENT

Figure 1:
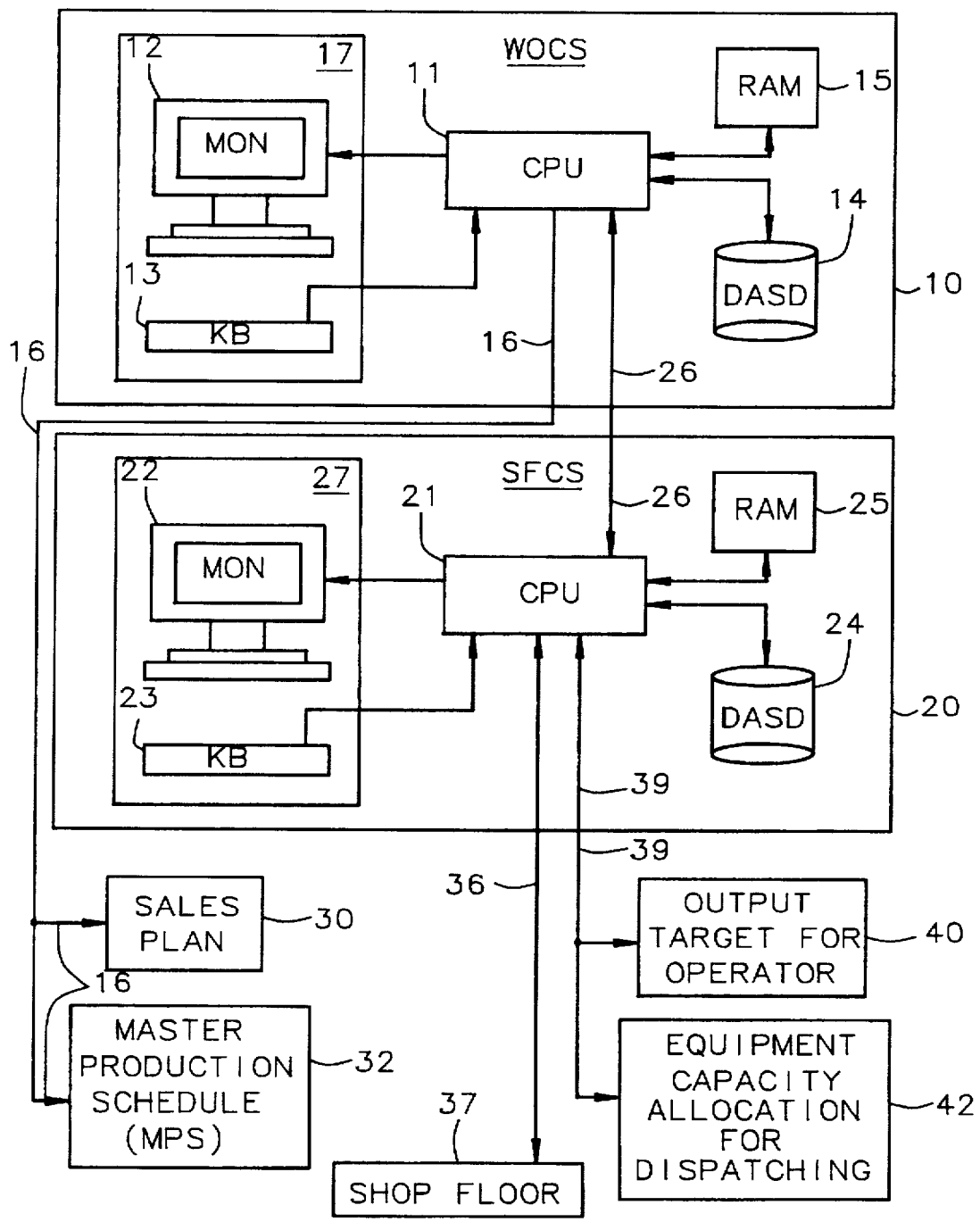
FIG. 1 shows the architecture of a computer control system included in a preferred embodiment of this invention. The system includes a central Wafer Output Control System (WOCS) and a Shop Flow Control System (SFCS) which are interconnected by a bus line.

The wafer output control and management method of this invention takes the Work in Process (WIP) profile and the cycle time into consideration. Then a dynamic equipment capacity allocation mechanism is provided which accurately forecasts wafer output and equipment allocation as the basis for setting operation targets. This method is coded for use with Windows™ software.

The resulting on-line control system provides as follows:

Daily Output ($DO_j$),

Equipment Capacity allocation ($EC_{kij}$),

Daily beginning and end of WIP,

Daily moves,

Stage turn ratio, and

Aids with the wafer start strategy.
where i=Stage No.=1,2,..,N;

j=Part No.=1,2,..,P;

k=Recipe=1,2,..,R

DEFINITIONS (1) WIP ($W_{ij}$): (Work In Process) comprises Work (wafers) included in the production line from wafer start to QC (Quality Control) output inspection. $W_{ij}$ includes work queued or in process in the production line.

$$W_{ij}=\text{Queued WIP+Running } W_{ij}=QW_{ij}+RW_{ij}$$

where as follows:

Queued WIP ($QWIP$)=$QW_{ij}$=WIP which has not been processed.

Running WIP ($RWIP$)=$RW_{ij}$=partially completed WIP.

(2) Stage: The IC (Integrated Circuit) manufacturing process consists of more than 300 process steps or recipes. The same recipes are used in the process flow due to the fact that the same program is employed. To perform scheduling control and naming easily, a stage is defined as a set (collection) of several recipes which perform a broader function such as wafer marking or zero aligning. A stage is based on process functions which are performed, so each stage has a unique part in the full process flow of each product.

EXAMPLE

| Stage | Description |
| --- | --- |
| MKWF | Wafer Mark |
| ALZER | Zero Align |
| ETZER | Zero Etching |
| STZER | Zero Stripe |
| ALNW | N Well Align |

(3) WIP In Flow ($IF_{ij}$) Flow rate per day for each stage. The flow rate for a stage comprises the accumulated WIP from previous stages and the accumulated cycle time comprises a one day cycle for the previous stages.

(4) Descendant Stages: In a one day time span, after processing of a dispatched machine, each candidate stage requests processing by the next machine. But the next machine could service other stages and those other stages would also join dispatching at the next time of dispatching, so those stages are referred to as descendant stages. For each stage in a full run process, the following stages of a stage for their accumulated cycle time is equal to 1.

(5) WIP Out Flow ($OF_{ij}$): WIP flow for descendant stages, which reflect the loading of the descendant stage.

(6) Flow intensity ($FL_{ij}$): In a full run process, the Flow Intensity ($FL_{ij}$) is defined as WIP In Flow ($IF_{ij}$) divided by WIP Out Flow ($OF_{ij}$) for each stage.

(7) Equipment Capacity Allocation ($EC_{kij}$): In full run process, each piece of equipment might serve to perform several recipes so this Equipment Capacity ($C_i$) allocates a ratio to each recipe.

(8) Stage bottleneck equipment: In each stage, there are several recipes to be processed. That means that several pieces of equipment also provide capacity in this stage. For each recipe there is a definition of the equipment required to provide service in the shop flow system. The output capacity can be defined as the bottleneck equipment capacity in this stage due to the WIP stream, since output will be constrained by the capacity of bottleneck equipment.

(9) Initial WIP: At the start of operation with this method, the WIP initial status (quantity in each stage) is downloaded from the Shop Flow Control System (SFCS) that they reflect a real WIP profile on the shop floor in the FAB. This is called the Initial WIP.

(10) Remaining WIP ($RW_{ij}$): At the end of each day, the WIP profile is to be changed, in each stage, due to wafers which have been fabricated, so the final WIP profile for each end of day is the "Remaining WIP ($RW_{ij}$)" at the end of the day.

(11) SALES PLAN (30 IN FIG. 1) Determine what kind and quantity of product should be produced to be sold.

(12) MASTER PRODUCTION SCHEDULE (MPS) (32 IN FIG. 1) This schedule settles when to wafer start into the FAB and how many products can be produced.

(13) OUTPUT TARGET FOR OPERATOR (40 IN FIG. 1) To evaluate operator's performance for meeting target of company.

(14) EQUIPMENT CAPACITY ALLOCATION FOR DISPATCHING (42 IN FIG. 1) Dispatching is used to determine what recipe is (recipes are) to be processed after finishing the current recipe.

(15) PROCESS FLOW IC fabrication flow that includes over three hundred (300) steps.

FIG. 1 shows the architecture of a computer control system included in a preferred embodiment of this invention. The system includes a central Wafer Output Control System (WOCS) 10 and a Shop Flow Control System (SFCS) 20 which are interconnected by a bus line 26.

The WOCS 10 includes a Central Processing Unit (CPU) 11, a computer terminal 17, a Direct Access Storage Device (DASD) 14, and Random Access Memory (RAM) 15. Computer terminal 17 includes a computer monitor (MON) 12 and a keyboard (KB) 13. The CPU 11 is connected to supply data to MON 12 and to receive data from KB 13. The CPU 11 is also connected to send and receive data back and forth from the RAM 15 and DASD 24. KB 13 of computer terminal 17 is used by the operator to enter data into the CPU 11. Alternative conventional interactive means can be used to enter data such as a mouse or light pen. The monitor MON 12 of computer terminal 17 includes a display screen for display of data from the CPU 11 to the operator for use in reading data displayed and making selections of alternative features during operation of the WOCS system.

Interconnection line 16 delivers information (output data) from CPU 11 to the sales plan unit 30 and Master Production Schedule (MPS) unit 32.

Interconnection line 26 carries output data from the CPU 21 in SFCS 20 to CPU 11 and carries input data from CPU 11 to CPU 21.

The SFCS 20 includes the Central Processing Unit (CPU) 21, a computer terminal 27, a Direct Access Storage Device (DASD) 24, and a Random Access Memory (RAM) 25. Computer terminal 27 includes a computer monitor (MON) 22 and a keyboard (KB) 23. The CPU 21 is connected to supply data to the monitor 22 of computer terminal 27 and to receive data from KB 23 of computer terminal 27. The CPU 21 is also connected to send and receive data back and forth from the RAM 25 and DASD 24. As stated above, interconnection line 26 carries data from CPU 21 to CPU 11 and conversely line 26 carries data from CPU 11 to CPU 21. KB 23 is used by the operator to enter data into the CPU 11. Alternative conventional interactive means can be used to enter data such as a mouse or light pen. The monitor MON 22 includes a display screen for display of data from the CPU 21 to the operator for use in reading data displayed or in making selections of alternative features during operation of the SFCS system.

Interconnection line 36 connects CPU 21 to the shop floor 37 (or the FAB) where a conventional terminal composed of a monitor and a keyboard.

Interconnection line 36 connects CPU 21 to output target for operator 40 for display on a monitor and to equipment capacity allocation for dispatching 42 for display on a monitor.

The method of this invention employs the sequence of steps as follows:

Step 1: Import (Load) process flow from the SFCS into WOCS.

Step 2: Import (Load) stage Cycle Time ($CT_{ij}$) From SFCS into WOCS.

Step 3: Import (Load) WIP ($W_{ij}$) from SFCS into WOCS.

Step 4: Calculate stage In Flow ($IF_{ij}$).

Step 5: Calculate stage Out Flow ($OF_{ij}$).

Step 6: Calculate stage Flow Intensity ($FL_{ij}$).

Step 7: Calculate Equipment Capacity ($C_i$).

Step 8: Calculate Equipment Capacity Allocation ($EC_{kij}$) to recipes.

Step 9: Find bottleneck equipment in each stage, and let its capacity as Stage Capacity ($SC_{ij}$).

Step 10: Rolling Output and WIP ($O_{ij}$).

Step 11: Calculate Remaining WIP ($RW_{ij}$).

Step 12: Collect the output of final stage as Daily Output ($DO_j$).

Step 13: Duplicate Remaining WIP ($RW_{ij}$) as Initial WIP ($W_{ij}$) of next day.

Step 14: If not end of running period then go to step 3 for next day Rolling Output ($O_{ij}$).

EXAMPLE I

Figure 3:
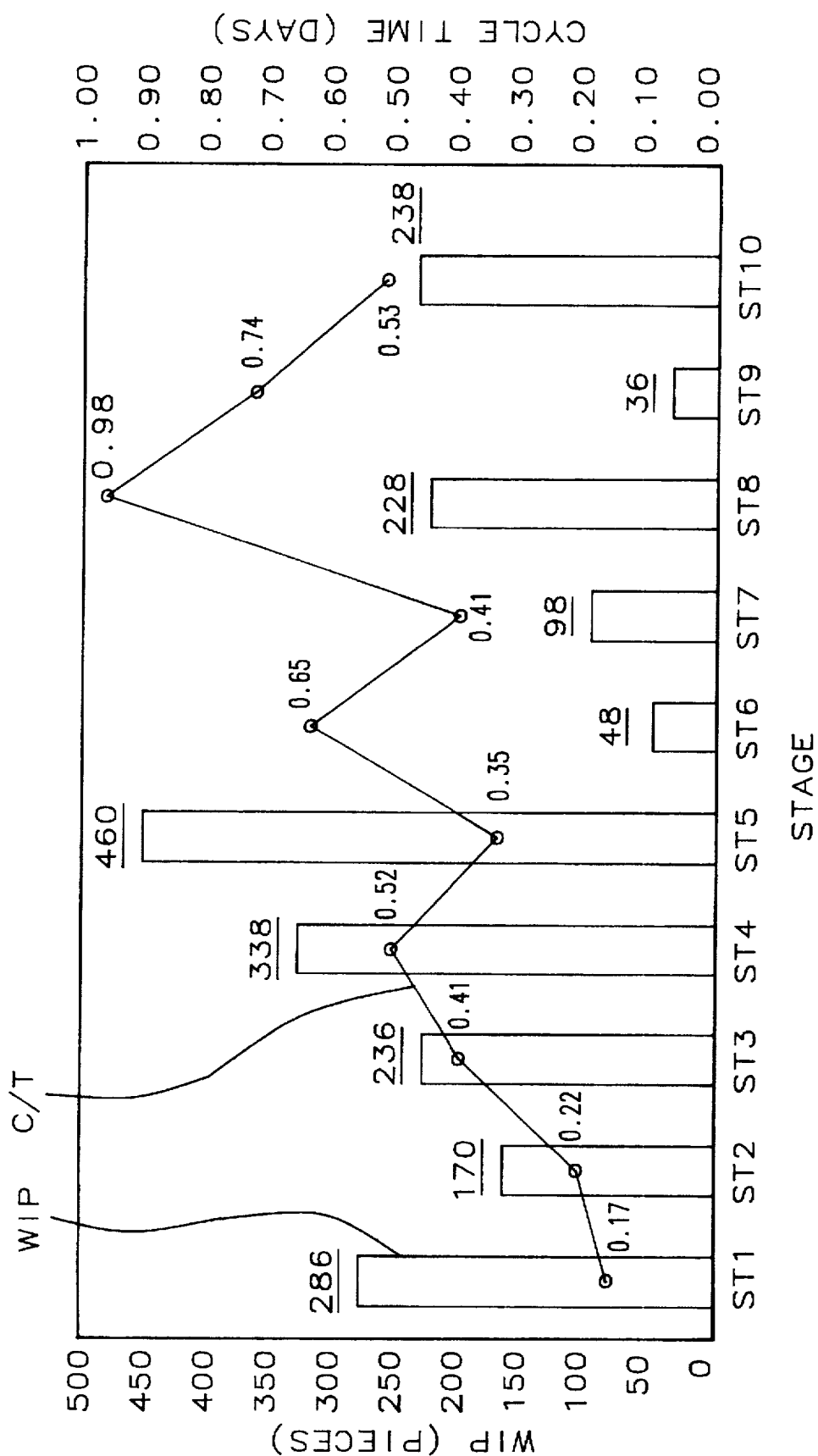
FIG. 3 is a graph of WIP and Cycle time for the stages ST1 through ST10 of a plant operating in accordance with this invention.

For ease of understanding this method, in this example consider only one product part. FIG. 3 and TABLE I below show the Initial WIP and cycle time. FIG. 3 is a graph of WIP and Cycle time for the stages ST1 to ST10 of a plant operating in accordance with this invention.)

TABLE I

| STAGE | WIP ($W_{ij}$) (pieces) | CYCLE TIME ($CT_{ij}$) (days) |
|---|---|---|
| ST1 | 286 | 0.17 |
| ST2 | 170 | 0.22 |
| ST3 | 236 | 0.41 |
| ST4 | 338 | 0.52 |
| ST5 | 460 | 0.35 |
| ST6 | 48 | 0.65 |
| ST7 | 98 | 0.41 |
| ST8 | 228 | 0.98 |
| ST9 | 36 | 0.74 |
| ST10 | 238 | 0.53 |

See TABLE III for basic data assumptions and data calculation of Stage 1 to Stage 5. See TABLE V for equipment basic data and capacity.

Figure 2A:
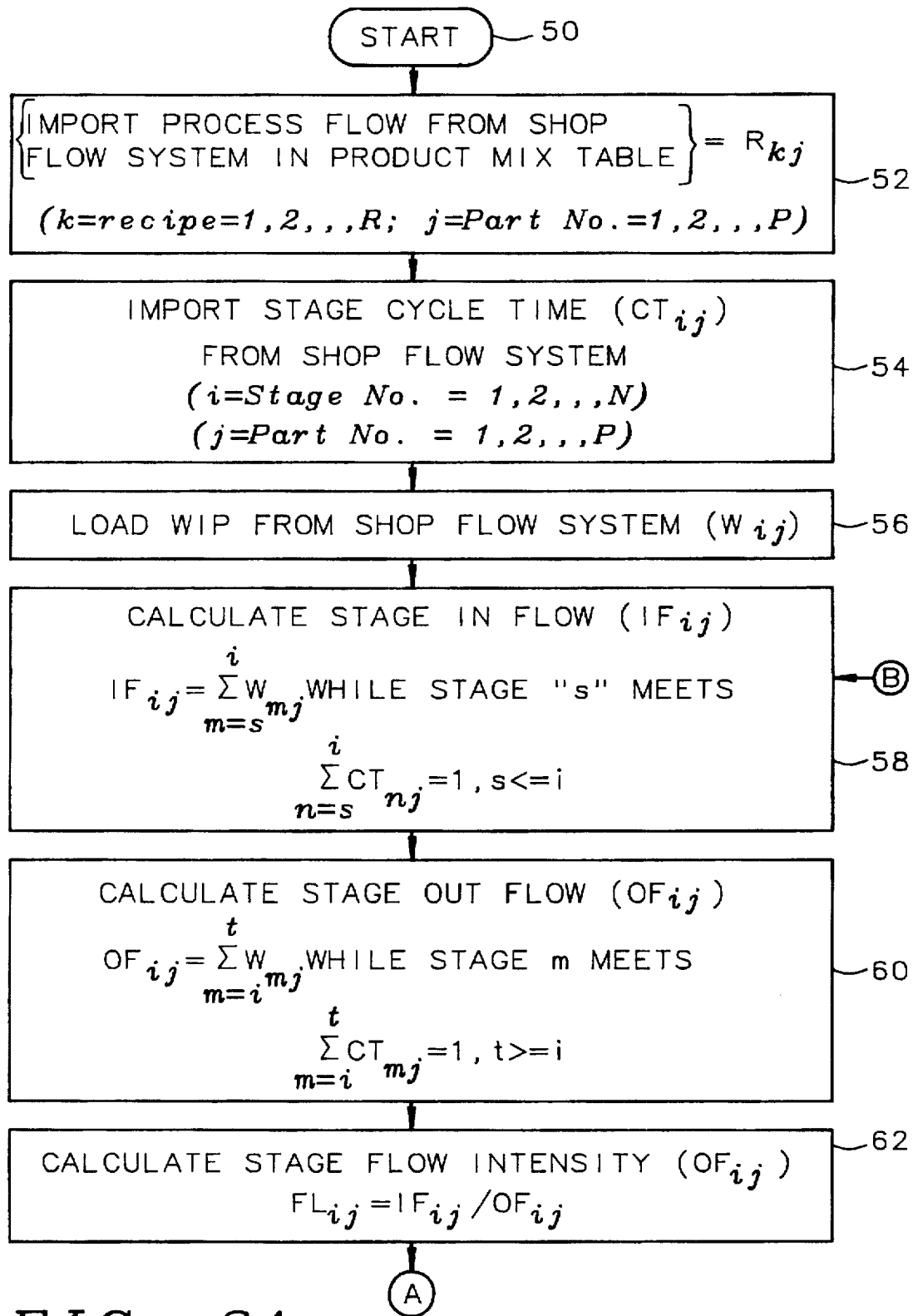
FIGS. 2A–2C illustrate in flow chart form a method in accordance with this invention for operating a computer control system for wafer output control and management in an integrated circuit manufacturing plant.
Figure 2B:
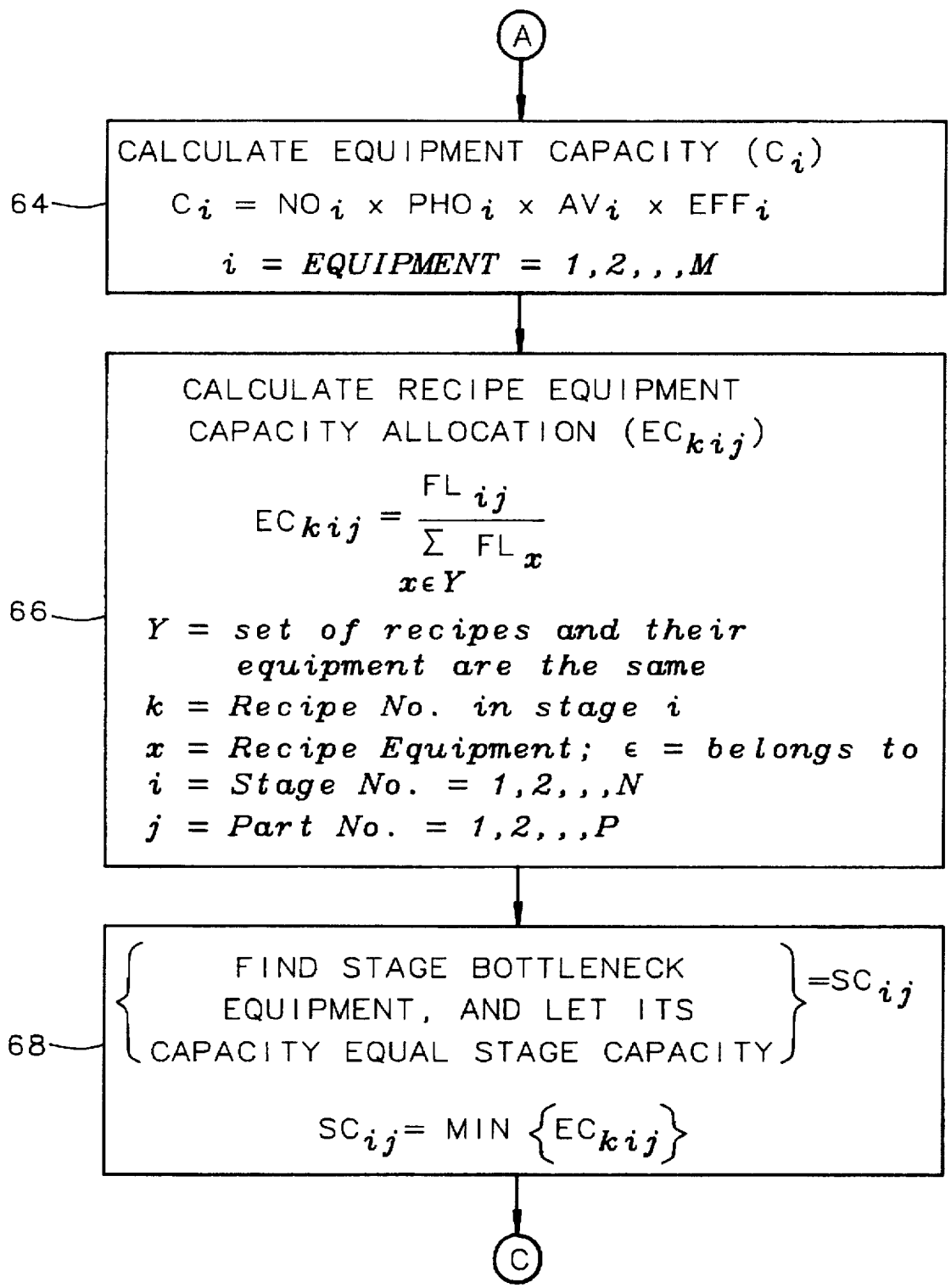
Figure 2C:
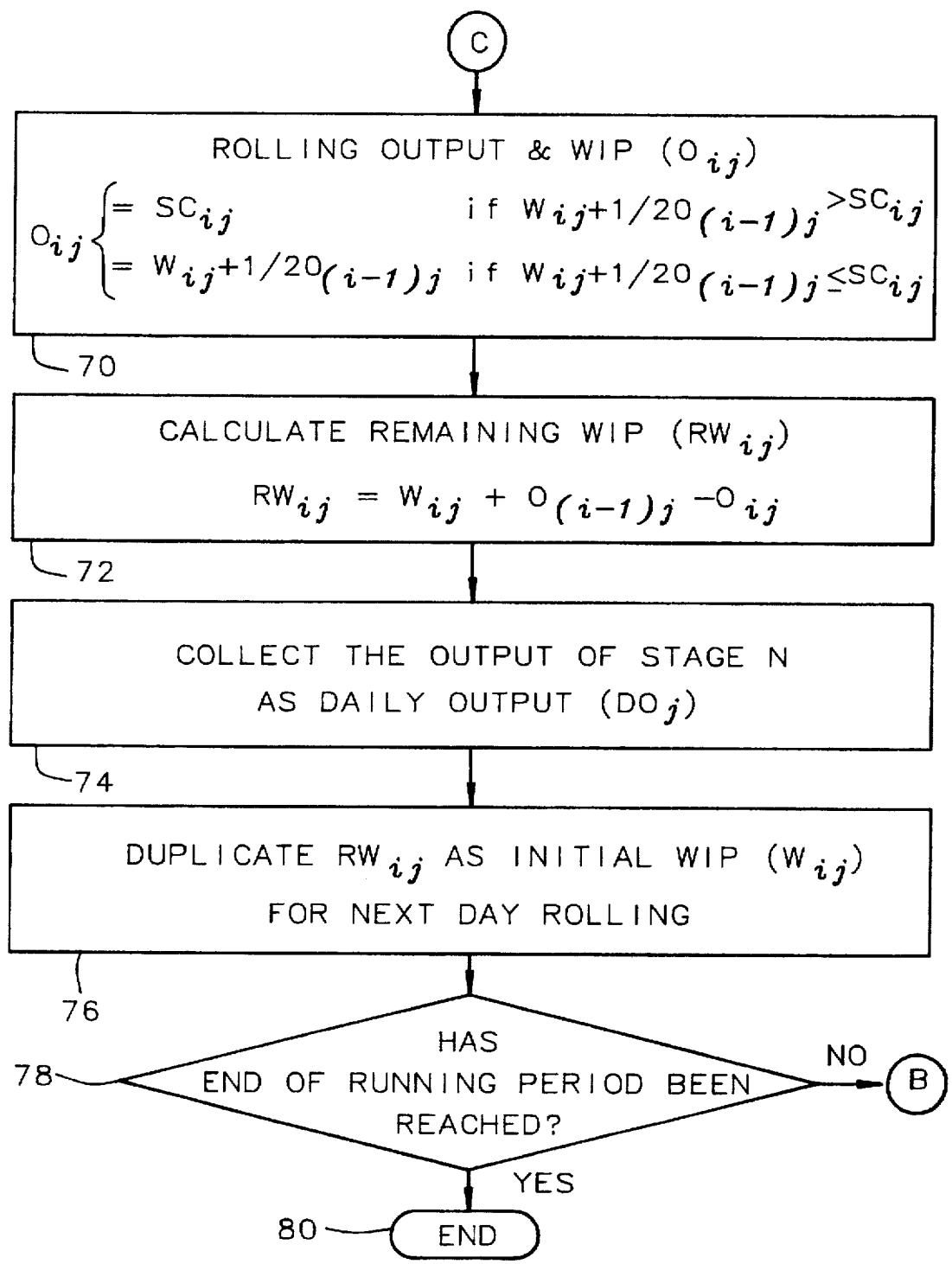

FIGS. 2A-2C illustrate in flow chart form a method in accordance with this invention for operating a computer control system for wafer output control and management in an integrated circuit manufacturing plant.

Step 1: Load Process Flow ($R_{kj}$) from Shop Flow Control System

In block 52 in FIG. 2A the system imports Process Flow $R_{kj}$ data from SFCS 20 in FIG. 1 from a Product mix table stored in DASD 24 in SFCS 20. See TABLE II, below. k=recipe=1,2, ... R; j=Part No.=1,2, ... P In TABLE II, for each part, a process flow defines its process sequence, process equipment, stage and description.

TABLE II

| PROCESS FLOW FROM SHOP FLOW SYSTEM | | | | |
|---|---|---|---|---|
| No | Recipe | Equipment | Description | Stage |
| 1 | R1 | E1 | Wafer Clean | ST1 |
| 2 | R2 | E2 | Pre-Imp Ox | ST1 |
| 3 | R3 | E3 | Wafer Mark | ST1 |
| 4 | R4 | E4 | Wafer Clean | ST2 |
| 5 | R5 | E1 | Alignment | ST2 |
| 6 | R6 | E5 | Inspection | ST2 |
| 7 | R7 | E6 | Ox etching | ST2 |
| 8 | R8 | E7 | Baking | ST3 |
| 9 | R9 | E8 | Zero layer Etching | ST3 |
| 10 | R10 | E5 | Ashing | ST3 |
| 11 | R11 | E9 | Photo resist stripe | ST3 |
| 12 | R12 | E2 | After stripe inspection | ST4 |
| 13 | R13 | E10 | Zero layer measurement | ST4 |
| 14 | R14 | E11 | Alignment | ST4 |

TABLE II-continued

PROCESS FLOW FROM SHOP FLOW SYSTEM

| No | Recipe | Equipment | Description | Stage |
|----|--------|-----------|-------------|-------|
| 15 | R15    | E12       | Inspection  | ST4   |
| 16 | R16    | E4        | Pre-Imp Baking | ST5 |
| 17 | R17    | E8        | N-well Implant | ST5 |
| 18 | R18    | E13       | Ashing      | ST5   |

Step 2: Load or Import Stage Cycle Time ($CT_{ij}$) from SFCS

The Stage Cycle Time $CT_{ij}$ values, which are stored in the DASD 24, are loaded from SFCS 20 into the CPU 11 in WOCS 10 in FIG. 1. Referring to block 54 in FIG. 2A, which follows after the step in block 52, the system imports Cycle Time $Ct_{ij}$ data from SFCS 20 in FIG. 1 from a cycle time table stored in DASD 24 in SFCS 20.

See an example of the values loaded (TABLE III):

Stage 1=$CT_{11}$=0.17 Days

Stage 2=$CT_{21}$=0.12 Days

Stage 3=$CT_{31}$=0.41 Days

Stage 4=$CT_{41}$=0.52 Days

Stage 5=$CT_{51}$=0.35 Days

The values ($W_{ij}$) which were previously stored in RAM 25 or DASD 24 in SFCS 20 are supplied to CPU 11 in WOCS 10 as described in block 56 in FIG. 1.

Step 4: Calculate Stage In Flow ($IF_{ij}$).

In block 58 in FIG. 2A the step of calculating Stage In Flow ($IF_{ij}$) is as follows:

$$IF_{ij} = \sum_{m=s}^{i} W_{mj}$$

while Stage "s" meets $$\sum_{n=s}^{i} CT_{nj} = 1, s \leq i$$

where i=Stage No. =1,2, ... N; j=Part No.=1,2, ... P

See TABLE III, where the In Flow ($IF_{ij}$) for accumulated cycle time of previous stages is equal to 1.

At Stage 5 the calculation is as follows:

$CT_{ij}$ at Stage 5=0.35 days $CT_{ij}$ at Stage 4=0.52 days $CT_{ij}$ at Stage 3=0.41 days

TABLE III

CALCULATION EXAMPLE

| STAGE | WIP $W_U$ pieces | CYCLE TIME $CT_{ij}$ days | IF | OF | FLOW INTEN-SITY FL | RECIPE | EQUIP-MENT | RECIPE ALLO-CATION | STAGE CAPA-CITY |
|-------|------|------|-----|-----|--------|--------|-------|------|------|
| ST1 | 286 | 0.17 | 286 | 647 | 44.2% | R1 | E1 | 330 | 324 |
|     |     |      |     |     |       | R2 | E2 | 324 |     |
|     |     |      |     |     |       | R3 | E3 | 603 |     |
| ST2 | 170 | 0.22 | 456 | 583 | 78.2% | R4 | E4 | 119 | 119 |
|     |     |      |     |     |       | R5 | E1 | 583 |     |
|     |     |      |     |     |       | R6 | E5 | 460 |     |
|     |     |      |     |     |       | R7 | E6 | 589 |     |
| ST3 | 236 | 0.41 | 692 | 808 | 85.6% | R8 | E7 | 564 | 111 |
|     |     |      |     |     |       | R9 | E8 | 111 |     |
|     |     |      |     |     |       | R10 | E5 | 504 |     |
|     |     |      |     |     |       | R11 | E9 | 570 |     |
| ST4 | 338 | 0.52 | 628 | 508 | 123.6% | R12 | E2 | 905 | 480 |
|     |     |      |     |     |       | R13 | E10 | 480 |     |
|     |     |      |     |     |       | R14 | E11 | 486 |     |
|     |     |      |     |     |       | R15 | E12 | 755 |     |
| ST5 | 460 | 0.35 | 873 | 132 | 661.4% | R16 | E4 | 1007 | 432 |
|     |     |      |     |     |       | R17 | E8 | 860 |     |
|     |     |      |     |     |       | R18 | E13 | 432 |     | k = recipe = 1, 2, , , R; j = Part No. = 1, 2, , , P

Step 3: Load WIP ($W_{ij}$) From SFCS

Referring to block 56 in FIG. 2A, which follows after the step in block 54, the system imports WIP ($W_{ij}$) data from SFCS 20 in FIG. 1 from a WIP ($W_{ij}$) table stored in DASD 24 in SFCS 20 in FIG. 1. The WIP ($W_{ij}$) data is loaded into Wafer Output Control System 10. For stages 1–5 the values of ($W_{ij}$) are listed in TABLE III above. The listed values are as follows:

i=Stage No.=1,2, ... N; j=Part No.=1,2, ... P

WIP of Stage 1=$W_{11}$=286

WIP of Stage 2=$W_{21}$=170

WIP of Stage 3=$W_{31}$=236

WIP of Stage 4=$W_{41}$=338

WIP of Stage 5=$W_{51}$=460

Referring to FIG. 2A in block 56 the system loads WIP data ($W_{ij}$) from the SFCS 20 in FIG. 1 into the WOCS 10.

So for one day In Flow ($IF_{ij}$) at Stage 5=$IF_{51}$ $IF_{51}=W_{51}+W_{41}+[(1-0.35-0.52)/0.41]\times W_{31}$ $IF_{51}=46+338+[(0.13)/0.41]\times 236=459$ pieces $IF_{51}=384+[0.317]\times 236=384+74.8$ $IF_{51}=458.8$ which rounds off to 459 pieces.

Step 5: Calculate Stage Out Flow ($OF_{ij}$)

In block 60 in FIG. 2A, which follows after the step 58 in FIG. 2A, the formula for calculating Stage Out Flow ($OF_{ij}$) is as follows:

$$OF_{ij} = \sum_{m=i}^{t} W_{mj}$$

while Stage m meets $$\sum_{m=i}^{t} CT_{mj} = 1, t > i$$

where i=Stage No.=1,2,...N; j=Part No.=1,2,...P

See TABLE III, the Out Flow ($OF_{ij}$) for accumulated cycle time of previous stages is equal to 1.

At Stage 5 the calculation is as follows:

$CT_{ij}$ at Stage 6=0.65 days (See TABLE I and FIG. 3)

$CT_{ij}$ at Stage 7=0.41 days (See TABLE I and FIG. 3)

So for one day Out Flow ($OF_{ij}$) at Stage 5=$OF_{51}$

=W61+(1−0.65)/0.41×$W_{61}$

=48+0.35/0.41×98

=132 pieces

Step 6 Calculate Stage Flow Intensity

In block 62 in FIG. 2B, which follows after the step 60 in FIG. 2A, the Stage Flow Intensity $FL_{ij}$ is calculated as follows:

$$FL_j = IF_{ij}/OF_{ij}$$

where i=Stage No.=1,2,...N; j=Part No.=1,2,...P

See TABLE III, the Flow Intensity ($FL_{ij}$) for each stage should be, $FL_{11}=IF_{11}/OF_{11}=286/647=44.2\%$ $FL_{21}=IF_{21}/OF_2=456/583=78.2\%$ $FL_{31}=IF_{31}/OF_3=692/808=85.6\%$ $FL_{41}=IF_{41}/OF_{41}=628/508=123.6\%$ $FL_{51}=IF_{51}/OF_{51}=873/132=661.4\%$ Step 7 Calculate the Equipment Capacity ($C_i$)

Referring to block 64 in FIG. 2B, which follows after the step 62 in FIG. 2B, and TABLE V, the value of the ith Equipment Capacity ($C_i$) per day is calculated as follows:

$$C = NO_i \times POH_i \times AV_i \times EFF_i$$

where i=Equipment 1,2,...M $POH_i$=ith equipment POH $AV_i$=ith equipment Availability Ratio $EFF_i$=ith equipment Efficiency Ratio $NO_i$=ith equipment number Step 8: Calculate the Equipment Capacity Allocation to Recipes ($EC_{kij}$)

In block 66 in FIG. 2B, which follows after the step 64 in FIG. 2B, the Equipment Capacity Allocation to Recipes $EC_{kij}$ is calculated as follows:

$$EC_{kij} = \frac{FL_{ij}}{\sum_{x \in Y} FL}$$

where:

k=Recipe No. in stage i=1,2,...R;

i=Stage No.=1,2,...N; j=Part No.=1,2,...P;

Y=set of recipes and their equipment are the same x=Recipe equipment

∈=Belongs to

5th Equipment serve recipe (in Stage 2), recipe 10 (in Stage 3),

Flow intensity of Stage 2=78.2%

Flow intensity of Stage 3=175.8% and the capacity of 5th equipment is 964 pieces/day (TABLE V)

So 5th Equipment Capacity Allocation ($EC_{kij}$) should be,

Capacity allocated to recipe 6

$EC_{kij}$=78.2%/(78.2%+85.7%) * 964=460 pieces/day

Capacity allocated to recipe 10

$EC_{kij}$=85.7%/(78.2%+85.7%) * 964=504 pieces/day

Step 9: Find the Bottleneck Equipment in each Stage, and let its Capacity ($EC_{kij}$) be Stage Capacity ($SC_{ij}$)

Referring to block 68 in FIG. 2B, which follows after the step 66 in FIG. 2B, the next step is to Find Stage Bottleneck Equipment, and let its capacity equal Stage Capacity $SC_{ij}$ which equals Min ($EC_{kij}$)

where i=Stage No.=1,2,...N; j=Part No.=1,2,...P; and k=recipe no. in Stage i

Referring to Table III, in Stage 1, the allocated capacity of R1, R2, and R3 are 330, 324, and 603 respectively. Thus the Min{330,324,603} value in Stage 1 recipe allocation capacity is the R2 value of 324 pieces/day.

Step 10: Rolling Output & WIP ($O_{ij}$)

Referring to block 70 in FIG. 2C, which follows after the step 68 in FIG. 2B, Rolling Output & WIP ($O_{ij}$) is calculated as follows:

$$O_{ij} \begin{cases} SC_{ij} & \text{if } (W_{ij} + 1/2\, O_{(i-1)j} > SC_{ij}) \\ W_{ij} + 1/2\, O_{(i-1)j} & \text{if } (W_{ij} + 1/2\, O_{(i-1)j} \leq SC_{ij}) \end{cases}$$

i=Stage No.=1,2,...N;

j=Part No.=1,2,...P

See TABLE IV, which shows the data produced by the calculation of wafer output for the first day.

TABLE IV

| | ROLLING OUTPUT | | | |
|---|---|---|---|---|
| Stage | Stage Capacity | Initial WIP | Stage output | Remaining WIP |
| ST1 | 324 | 286 | 286 | 0 |
| ST2 | 119 | 170 | 119 | 337 |
| ST3 | 111 | 236 | 111 | 244 |
| ST4 | 480 | 338 | 394 | 56 |
| ST5 | 432 | 460 | 432 | 422 |

At Stage 1, due to Stage Capacity ($SC_{ij}$) is 324 pieces/day and its WIP is 286 pieces, so Stage 1 should output 286 pieces in first day.

And these 286 pieces wafer should be moved to Stage 2 as WIP of Stage 2, for these WIP there should be ½ effective to be processed in Stage 2 due to wafer is linearly moved but not moved instantly. So at Stage 2 there should have 286/2+117=260 pieces effective wafers as WIP waited processed, and due to capacity of Stage 2 is 119 pieces/day so the wafer output for Stage 2 should be 119 pieces and that should also be moved to Stage 3 as WIP of Stage 3.

At Stage 4, the effective WIP are 338+111/2=394 pieces where 111 pieces wafers are moved from Stage 3. And due to capacity of Stage 4 is 480 pieces/day, so in this phase, Stage 4 should output 394 pieces at most.

Step 11: Calculating Remaining WIP ($RW_{ij}$)

Referring to block 72, which follows after the step 70 in FIG. 2C, in FIG. 2C $RW_{ij}$ is calculated as follows:

$$RW_{ij}=W_{ij}+O_{(i-1)j}-O_{ij},$$

where i=Stage No.=1,2, . . . N;

j=Part No.=1,2, . . . P

Referring to TABLE IV Rolling Output Table, at Stage 1 (ST1), the Initial WIP is 286 pieces and Stage 1 output is 286 pieces, so the Remaining WIP ($RW_{ij}$) is zero as listed in Table IV.

At Stage 2 (ST2), the Initial WIP is 117 pieces and there are 286 pieces WIP from Stage 1, so total wafer in this phase is 117+286=403 pieces, and Stage 2 output is 119 pieces, so the Remaining WIP ($RW_{ij}$) is 337 pieces wafers which remain in Stage 2.

Step 12: Collect Output of Final Stage as Daily Output ($DO_j$)

As described in block 74 in FIG. 2C, which follows after the step 72 in FIG. 2C, the output of Stage N is collected as the Daily Output ($DO_j$)=$DO_j$, where j=Part No.=1,2, . . . p Referring to TABLE IV, the first day output should be 432 pieces from Stage 5.

Step 13: Duplicate Remaining WIP ($RW_{ij}$) from previous phase as Initial WIP ($W_{ij}$) of the Next Day Referring to block 76 in FIG. 2C, which follows after the step 74 in FIG. 2C, the Remaining WIP ($RW_{ij}$) of the first day is copied to the second day to be used as its Initial WIP ($W_{ij}$).

TABLE V

EQUIPMENT BASIC DATA AND CAPACITY

| Equipment | Eqp No. | POH | Availability | Efficiency | Capacity |
|---|---|---|---|---|---|
| E1 | 4 | 12 | 90% | 88% | 912 |
| E2 | 4 | 16 | 92% | 87% | 1229 |
| E3 | 2 | 15 | 93% | 90% | 603 |
| E4 | 4 | 15 | 92% | 92% | 1126 |
| E5 | 3 | 16 | 90% | 93% | 964 |
| E6 | 2 | 15 | 88% | 93% | 589 |
| E7 | 3 | 10 | 87% | 90% | 564 |
| E8 | 1 | 50 | 92% | 88% | 972 |
| E9 | 3 | 10 | 87% | 91% | 570 |
| E10 | 1 | 25 | 92% | 87% | 480 |
| E11 | 1 | 25 | 90% | 90% | 486 |
| E12 | 3 | 12 | 94% | 93% | 755 |
| E13 | 2 | 11 | 90% | 91% | 432 |

Referring to block 78 in FIG. 2C, which follows after the step 76 in FIG. 2C, the following test is made. "Has End of Running Period Been Reached?" The running period is a set period of time such as one month or one week. (The running period of time can be can be a month (30 day) iteration in the loop. At the end of the running period, after a month, the answer is Yes and the program ends.)

If YES, then the program ends in block 80.

If NO, then the program branches back as indicated by connector B to block 58 in FIG. 2A to calculate once more the In Flow ($IF_{ij}$) so that once again, then steps are repeated in sequence in the blocks 60, 62, 64, 66, 68, 70, 72, 74, 76, 78. When the end of the running period is reached, as determined in block 78, the system proceeds to step 80 to end the program.

While this invention has been described in terms of the above specific embodiment(s), those skilled in the art will recognize that the invention can be practiced with modifications within the spirit and scope of the appended claims, i.e. that changes can be made in form and detail, without departing from the spirit and scope of the invention. Accordingly all such changes come within the purview of the present invention and the invention encompasses the subject matter of the claims which follow.

Having thus described the invention, what is claimed as new and desirable to be secured by Letters Patent is as follows:

1. A method of output management of processing in a manufacturing plant with a plurality of stages during a running period comprises the steps as follows:

a) determine the stage In Flow ($IF_{ij}$) of Work In Process (WIP) in said plant, b) determine the Out Flow ($OF_{ij}$) of Work In Process (WIP) in said plant, c) calculate Flow Intensity ($FL_{ij}$) of said plant, d) calculate plant equipment Capacity ($C_{ij}$), e) calculate Equipment Capacity allocation ($EC_{ij}$) of said plant, f) determine the bottleneck Stage Capacity ($SC_{ij}$) of stages in said plant, g) determine the Rolling Output ($O_{ij}$) of said plant, h) calculate plant Remaining Work In Process ($RW_{ij}$), i) collect Daily Output ($DO_j$), j) duplicate Remaining Work In Process ($RW_{ij}$) as Initial WIP ($W_{ij}$) for next day, k) testing to determine whether said running period has ended and repeatedly looping back to step (a) until said running period has ended.

2. A method in accordance with claim 1 wherein In Flow ($IF_{ij}$) is calculated with the formula, as follows:

$$IF_{ij} = \sum_{m=s}^{i} W_{mj}$$

while Stage "s" meets $$\sum_{m=s}^{i} CT_{nj} = 1, s \leq i$$

where:

i=Stage Number=1,2, . . . N;

j=Part Number=1,2, . . . P.

3. A method in accordance with claim 1 wherein Out Flow ($OF_{ij}$) is calculated with the formula, as follows:

$$OF_{ij} = \sum_{m=i}^{t} W_{mj}$$

while Stage "m" meets $$\sum_{m=i}^{t} CT_{mj} = 1, t > i;$$

where i=Stage Number=1,2, . . . N;

j=Part Number=1,2, . . . P.

4. A method in accordance with claim 1 wherein stage flow intensity is calculated as follows:

$$FL_{ij} = \frac{IF_{ij}}{OF_{ij}}.$$

5. A method in accordance with claim 1 wherein Equipment Capacity ($C_j$) is calculated as follows:

$$C_i = NO_i \times POH_i \times AV_i \times EFF_i$$

where:

POH$_i$=ith equipment POH
AV$_i$=ith equipment Availability Ratio
EFF$_i$=ith equipment Efficiency Ratio
NO$_i$=ith equipment number
i=Equipment 1,2, . . . M.

6. A method in accordance with claim 1 wherein the Equipment Capacity Allocation to Recipes EC$_{kij}$ is calculated as follows:

$$EC_{kij} = \frac{FL_{ij}}{\sum_{x \in Y} FL}$$

where:

k=Recipe Number in stage i=1,2, . . . R;
i=Stage Number=1,2, . . . N;
j=Part Number=1,2, . . . P;
Y=set of recipes and their equipment are the same
x=Recipe Equipment
∈=Belongs to.

7. A method in accordance with claim 1 wherein the bottleneck Stage Capacity (SC$_{ij}$) is calculated as follows:

$$SC_{ij} = MIN\{EC_{kij}\}$$

where:

i=Stage Number=1,2, . . . N;
j=Part Number=1,2, . . . P;
k=recipe number in stage i.

8. A method in accordance with claim 1 wherein the Rolling Output (O$_{ij}$) is calculated as follows:

$$O_{ij} = SC_{ij}$$

if $(W_{ij} + \frac{1}{2} O_{(i-1)j}) > SC_{ij}$ $$O_{ij} = W_{ij} + \frac{1}{2} O_{(i-1)j}$$

if $(W_{ij} + \frac{1}{2} O_{(i-1)j}) \leq SC_{ij}$ where:

i=Stage Number=1,2, . . . N;
j=Part Number=1,2, . . . P.

9. A method in accordance with claim 1 wherein the Remaining WIP (RW$_{ij}$) is calculated as follows:

$$RW_{ij} = W_{ij} \times)_{(i-1)j} - O_{ij}$$

where i=Stage Number=1,2, . . . N;
j=Part Number=1,2, . . . P.

10. A method in accordance with claim 1 wherein In Flow (IF$_{ij}$ is calculated with the formula, as follows:

$$IF_{ij} = \sum_{m=s}^{i} W_{mj}$$

while Stage "s" meets $$\sum_{m=s}^{i} CT_{mj} = 1, s \leq i;$$

where i=Stage Number=1,2, . . . N;
j=Part Number=1,2, . . . P.

and said Out Flow (OF$_{ij}$) is calculated, as follows:

$$OF_{ij} = \sum_{m=i}^{t} W_{mj}$$

while Stage "m" meets $$\sum_{m=i}^{t} CT_{mj} = 1, t > i;$$

where i=Stage Number=1,2, . . . N;
j=Part Number=1,2, . . . P.

11. A method in accordance with claim 10 wherein stage flow intensity is calculated as follows:

$$FL_{ij} = \frac{IF_{ij}}{OF_{ij}}.$$

12. A method in accordance with claim 11 wherein Equipment Capacity (C$_i$) is calculated as follows:

$$C_i = NO_i \times POH_i \times AV_i \times EFF_i$$

where

POH$_i$=ith equipment POH
AV$_i$=ith equipment Availability Ratio
EFF$_i$=ith equipment Efficiency Ratio
NO$_i$=ith equipment number
i=Equipment 1,2, . . . M.

13. A method in accordance with claim 12 wherein the Equipment Capacity Allocation to Recipes EC$_{kij}$ is calculated as follows:

$$EC_{kij} = \frac{FL_{ij}}{\sum_{x \in Y} FL}$$

where k=Recipe Number in stage i=1,2, . . . R;
i=Stage Number=1,2, . . . N;
j=Part Number=1,2, . . . P;
Y=set of recipes and their equipment are the same
x=Recipe Equipment
∈=Belongs to.

14. A method in accordance with claim 13 wherein the bottleneck Stage Capacity (SC$_{ij}$) is calculated as follows:

$$SC_{ij} = MIN\{EC_{kij}\}$$

where i=Stage Number=1,2, . . . N;
j=Part Number=1,2, . . . P;
k=recipe number in stage i.

15. A method in accordance with claim 14 wherein the Rolling Output ($O_{ij}$) is calculated as follows:

$$O_{ij}=SC_{ij}$$

$$\text{if } (W_{ij}+\tfrac{1}{2}O_{(i-1)j}>SC_{ij})$$

$$O_{ij}=W_{ij}+\tfrac{1}{2}O_{(i-1)j}$$

$$\text{if } (W_{ij}+\tfrac{1}{2}O_{(i-1)j}\leq SC_{ij})$$

where
i=Stage Number=1,2, . . , N;
j=Part Number=1,2, . . , P.

16. A method in accordance with claim 15 wherein the Remaining WIP ($RW_{ij}$) is calculated as follows:

$$RW_{ij}=W_{ij}\times O_{(i-1)j}-O_{ij}$$

where
i=Stage Number=1,2, . . , N;
j=Part Number=1,2, . . , P.

17. A system for output management of processing in a manufacturing plant with a plurality of stages during a running period, comprising the functions as follows:
   a) means for determining the stage In Flow ($IF_{ij}$) of Work In Process (WIP) in said plant,
   b) means for determining the Out Flow ($OF_{ij}$) of Work In Process (WIP) in said plant,
   c) means for calculating Flow Intensity ($FL_{ij}$) of said plant,
   d) means for calculating equipment Capacity ($C_{ij}$) of said plant,
   e) means for calculating Equipment Capacity allocation ($EC_{ij}$) of said plant,
   f) means for determining the bottleneck Stage Capacity ($SC_{ij}$) of stages in said plant,
   g) means for determining the Rolling Output ($O_{ij}$) of said plant,
   h) means for calculating Remaining Work In Process ($RW_{ij}$) of said plant,
   i) means for collecting Daily Output ($DO_j$),
   j) means for duplicating Remaining Work In Process ($RW_{ij}$) as Initial WIP ($W_{ij}$) for next day,
   k) means for testing to determine whether said running period has ended and repeatedly looping back to (a) until said running period has ended.

18. A system in accordance with claim 17 wherein In Flow ($IF_{ij}$) is calculated with the formula, as follows:

$$IF_{ij}=\sum_{m=s}^{i} W_{mj}$$

while Stage "s" meets $$\sum_{m=s}^{i} CT_{mj}=1, s\leq i$$

where:
i=Stage Number=1,2, . . , N;
j=Part Number=1,2, . . , P.

19. A system in accordance with claim 17 wherein Out Flow ($OF_{ij}$) is calculated with the formula, as follows:

$$OF_{ij}=\sum_{m=i}^{t} W_{mj}$$

while Stage "m" meets $$\sum_{m=i}^{t} CT_{mj}=1, t>i$$

where
i=Stage Number=1,2, . . . N;
j=Part Number=1,2, . . . P.

20. A system in accordance with claim 17 wherein stage flow intensity is calculated as follows:

$$FL_{ij}=\frac{IF_{ij}}{OF_{ij}}.$$

21. A system in accordance with claim 17 wherein Equipment Capacity ($C_i$) is calculated as follows:

$$C_i=NO_i\times POH_i\times AV_i\times EFF_i$$

where
$POH_i$=ith equipment POH
$AV_i$=ith equipment Availability Ratio
$EFF_i$=ith equipment Efficiency Ratio
$NO_i$=ith equipment number
i=Equipment 1,2, . . , M.

22. A system in accordance with claim 17 wherein the Equipment Capacity Allocation to Recipes $EC_{kij}$ is calculated as follows:

$$EC_{kij}=\frac{FL_{ij}}{\sum_{x\in Y} FL}$$

where
k=Recipe Number in stage i=1,2, . . . R;
i=Stage Number=1,2, . . . N;
j=Part Number=1,2, . . . P;
Y=set of recipes and their equipment are the same
x=Recipe Equipment
∈=Belongs to.

23. A system in accordance with claim 17 wherein the bottleneck Stage Capacity ($SC_{ij}$) is calculated as follows:

$$SC_{ij}=\text{MIN}\{EC_{kij}\}$$

where
i=Stage Number=1,2, . . . N;
j=Part Number=1,2, . . P;
k=recipe number in stage i.

24. A system in accordance with claim 17 wherein the Rolling Output ($O_{ij}$) is calculated as follows:

$$O_{ij}=SC_{ij} \text{ if } (W_{ij}+\tfrac{1}{2}O_{(i-1)j}>SC_{ij})$$

$$O_{ij}=W_{ij}+\tfrac{1}{2}O_{(i-1)j}; \text{ if } (W_{ij}+\tfrac{1}{2}O_{(i-1)j}\leq SC_{ij})$$

where
i=Stage Number=1,2, . . , N;

j=Part Number=1,2,...P.

25. A system in accordance with claim 17 wherein the Remaining WIP ($RW_{ij}$) is calculated as follows:

$$RW_{ij}=W_{ij} \times O_{(i-1)j}-O_{ij}$$

where i=Stage Number=1,2,...N;
j=Part Number=1,2,...P.

26. A system in accordance with claim 17 wherein In Flow ($IF_{ij}$) is calculated with the formula, as follows:

$$IF_{ij} = \sum_{m=s}^{i} W_{mj}$$

while Stage "s" meets $$\sum_{m=s}^{i} CT_{mj} = 1, s \leq i$$

and said Out Flow ($OF_{ij}$) is calculated with the formula, as follows:

$$OF_{ij} = \sum_{m=i}^{t} W_{mj}$$

while Stage "m" meets $$\sum_{m=i}^{t} CT_{mj} = 1, t > i$$

where i=Stage Number=1,2,...N;
j=Part Number=1,2,...P.

27. A system in accordance with claim 26 wherein stage flow intensity is calculated as follows:

$$FL_{ij} = \frac{IF_{ij}}{OF_{ij}}$$

28. A system in accordance with claim 27 wherein Equipment Capacity ($C_i$) is calculated as follows:

$$C_i = NO_i \times POH_i \times AV_i \times EFF_i$$

where i=Equipment 1,2,...M
$POH_i$=ith equipment POH
$AV_i$=ith equipment Availability Ratio
$EFF_i$=ith equipment Efficiency Ratio
$NO_i$=ith equipment number.

29. A system in accordance with claim 28 wherein the Equipment Capacity Allocation to Recipes $EC_{kij}$ is calculated as follows:

$$EC_{kij} = \frac{FL_{ij}}{\sum_{x \in Y} FL}$$

where k=Recipe Number in stage i=1,2,...R;
i=Stage Number=1,2,...N;
j=Part Number=1,2,...P;
Y=set of recipes and their equipment are the same
x=Recipe Equipment
∈=Belongs to.

30. A system in accordance with claim 29 wherein the bottleneck Stage Capacity ($SC_{kij}$) is calculated as follows:

$$SC_{ij}=MIN\{EC_{kij}\}$$

where i=Stage Number=1,2,...N;
j=Part Number=1,2,...P;
k=recipe number in stage i.

31. A system in accordance with claim 30 wherein the Rolling Output ($O_{ij}$) is calculated as follows:

$$O_{ij}=SC_{ij}; \text{ if } (W_{ij}+\tfrac{1}{2}O_{(i-1)j})>SC_{ij}$$

$$O_{ij}=W_{ij}+\tfrac{1}{2}O_{(i-1)j}; \text{ if } (W_{ij}+\tfrac{1}{2}O_{(i-1)j}) \leq SC_{ij}$$

where i=Stage Number=1,2,...N;
j=Part Number=1,2,...P.

32. A system in accordance with claim 31 wherein the Remaining WIP ($RW_{ij}$) is calculated as follows:

$$RW_{ij}=W_{ij} \times O_{(i-1)j}-O_{ij}$$

where i=Stage Number=1,2,...N;
j=Part Number=1,2,...P.

* * * * *